(12) United States Patent
Kuroda

(10) Patent No.: US 6,799,767 B2
(45) Date of Patent: Oct. 5, 2004

(54) CHUCK DEVICE

(75) Inventor: Takayuki Kuroda, Itami (JP)

(73) Assignee: Pascal Kabushiki Kaisha, Hyogo (JP)

( * ) Notice: Subject to any disclaimer, the term of this patent is extended or adjusted under 35 U.S.C. 154(b) by 132 days.

(21) Appl. No.: 10/009,879

(22) PCT Filed: Feb. 15, 2001

(86) PCT No.: PCT/JP01/01101
§ 371 (c)(1),
(2), (4) Date: Nov. 13, 2001

(87) PCT Pub. No.: WO01/68299
PCT Pub. Date: Sep. 20, 2001

(65) Prior Publication Data
US 2002/0158426 A1 Oct. 31, 2002

(30) Foreign Application Priority Data
Mar. 13, 2000 (JP) .................................... 2000-068698

(51) Int. Cl.$^7$ .......................................... B23B 31/177
(52) U.S. Cl. ...................... 279/121; 279/115; 279/112; 269/172; 269/240
(58) Field of Search ............................. 279/110, 112, 279/120, 121, 114, 115; 294/119.1; 269/172, 240; 901/31, 36–39

(56) References Cited

U.S. PATENT DOCUMENTS

| | | | | |
|---|---|---|---|---|
| 1,089,362 A | * | 3/1914 | Hannifin | 294/119.1 |
| 2,191,371 A | * | 2/1940 | Church | 279/121 |
| 2,993,701 A | * | 7/1961 | Arnold | 279/114 |
| 3,610,644 A | * | 10/1971 | Swanson et al. | 279/110 |
| 3,659,864 A | * | 5/1972 | Blattry | 279/121 |
| 3,765,691 A | * | 10/1973 | Saruhashi | 279/71 |
| 4,275,892 A | * | 6/1981 | Rohm | 279/130 |
| 5,522,607 A | * | 6/1996 | Chen | 279/121 |
| 5,967,581 A | * | 10/1999 | Bertini | 294/119.1 |
| 6,428,071 B2 | * | 8/2002 | Bertini | 294/119.1 |

FOREIGN PATENT DOCUMENTS

| | | | | |
|---|---|---|---|---|
| FR | 1256940 | * | 2/1961 | 279/121 |
| GB | 2112678 | * | 7/1983 | 297/121 |
| JP | 16583 | * | 2/1975 | 279/121 |
| JP | 27685 | * | 2/1977 | 279/121 |

* cited by examiner

Primary Examiner—Daniel W. Howell
(74) Attorney, Agent, or Firm—Darby & Darby

(57) ABSTRACT

A chuck device includes a first worm gear mechanism linked to a second worm wheel mechanism which operate in tandem to receive, increase, and redirect an input rotational drive force. A conversion mechanism receives and further augments the force from the second worm gear mechanism and converts the drive force into an axial force. The conversion mechanism transfers the axial force symmetrically to a pair of claw members. The claw members move relative to each other and firmly secure a work item to the chuck device.

17 Claims, 5 Drawing Sheets

CHUCK DEVICE

BACKGROUND OF THE INVENTION

1. Field of the Invention

The present invention relates to a chuck device. More specifically, the present invention relates to a chuck device with a plurality of gear mechanisms which increase a rotational drive force applied through an input member.

2. Description of the Related Art

Conventionally, in machine tools, a chuck device secures a work piece or tool to a work surface. Work surfaces may include a table, a work pallet, or a principal axis clamp. Such chucking devices typically include a base member, secured to the work surface, and a claw member movably mounted on the base member.

Conventional claw members are movable to allow the work piece or tool to be 'chucked' or secured in the chuck device. Chuck devices may include one, two, or three claw members.

Referring now to FIG. 9, a chuck device 100, secures a work piece Wa. Chuck device 100 includes a base member 101. An input shaft member 103 extends from inside base member 101 to project from a side opposite a claw member 102. Chuck device 100 also includes a conversion mechanism 104 and a hydraulic cylinder (not shown).

A leg 102a, of claw member 102, slidably engages a T-shaped groove 101a formed on base member 101. An outer end of input shaft 103 connects to the hydraulic cylinder (not shown).

Conversion mechanism 104 includes a conversion member 105 secured to input shaft member 103. Conversion member 105 includes a sloped engagement groove 105a thereon. Sloped engagement groove 105a has a T-shaped cross-section and is sloped relative to the direction of motion of claw member 102. An engagement section 102b on claw member 102 slidably engages sloped engagement groove 105a.

During operation, the hydraulic cylinder (not shown) drives input shaft member 103 and conversion member 105 in an axial direction. The resulting axial drive force is redirected by conversion mechanism 104. After redirection, the axial drive force is transferred to claw member 102, causing claw member 102 to move in the direction of an arrow a Referring now to FIG. 10, a chuck device 110 implemented by the present applicants includes a base member 111, a claw member 112, and an input member 113. Chuck device 110 also includes a conversion mechanism 114.

A leg 112a, on claw member 112, slidably engages a T-shaped groove 111a formed on base member 111. Input member 113, formed as a bolt, is screwed into base member 111. During operation, a rotational drive force is manually applied to input member 113, using a handle or other manual rotation tool 119, to tighten or loosen chuck device 110.

Conversion mechanism 114 includes a conversion member 115 which receives and engages a head of a shaft of input member 113. A sloped surface 115a on conversion member 115 is sloped relative to a direction of movement of claw member 112. A sloped surface 112b on claw member 112 is in planar contact with sloped surface 115a.

A compression spring 116 elastically biases claw member 112 toward input member 113.

During operation, when input member 113 is rotated in a tightening direction, conversion member 115 is driven downward into base member 111 to force claw member 112 in the direction of an arrow b, thus securing a work piece Wb. When input member 113 is rotated in a loosening direction, the biasing force of compression spring 116 urges claw member 112 to move in the releasing direction of an arrow c to release work piece Wb.

In conventional chuck devices, drive force applied through an input member is marginally increased (multiplied) to drive claw members. Unfortunately, any increase in drive force applied through the input member is limited by the sloped engagement grooves and sloped surfaces used in a conversion mechanism. This is a physical and design limitation which makes it difficult to provide a high force (since there is a lack of a multiplication rate) to increase the ratio to grip a work piece. As a result, in manually driven chuck devices, it is difficult to chuck a work piece or tool firmly. Failure to firmly chuck a work piece or tool may lead to reduced machining precision and damage to cutting tools. Manual operation may result in reduced ease of use and lower production efficiency. Repetitive manual chucking may lead to physically fatigued operators thus increasing safety risks and extending chucking time. In sum, manual chucking operations reduce productivity.

Unfortunately, where an automatic chuck devices drives the input member, the actuator makes the chuck device larger. The increase in size, increases production costs, production risks, and reduces productivity.

Increasing the slopes of the sloped engagement groove can improve the rate at which the drive force is increased. Unfortunately, the ratio of the displacement of a claw member to a displacement of the conversion member is very small. This ratio limits the size of the work piece or tool that can be chucked, thus further reducing operational versatility.

OBJECTS AND SUMMARY OF THE INVENTION

An object of the present invention is to provide a chuck device that improves and increases a rate of applied drive force.

Another object of the present invention is to provide a chuck device that improves usability and increases the efficiency and force of chucking operations.

Another object of the present invention is to provide a chuck device that is compact.

Another object of the present invention is to provide a highly versatile chuck device, easily adaptable to multiple production environments.

It is another object of the present invention to provide a chuck device that is readily adaptable to one or two claw embodiments, stationary or mobile embodiments, and flat, tilted, or multi-axial positions.

The present invention relates to a chuck device including a first worm gear mechanism linked to a second worm wheel mechanism which operate in tandem to receive, increase, and redirect an input rotational drive force. A conversion mechanism receives and further augments the drive force from the second worm gear mechanism and converts the drive force into an axial force. The conversion mechanism transfers the axial force symmetrically to a pair of claw members. The claw members move relative to each other and firmly secure a work item to the chuck device.

According to an embodiment of the present invention, there is provided a chuck device comprising: a first base member, a second base member on the first base member, first means for receiving and increasing a rotational force, the first means for receiving and increasing in the first base member, second means for receiving the rotational force from the first means and for further increasing the rotational force into an increased rotational force, the second means for receiving in the first base member, the second means for receiving effective to redirect the increased rotational force perpendicular to the first means for receiving and increasing, means for converting the increased rotational force from the second means into an increased axial force perpendicular to the first and the second means, and the means for converting operable between the first and the second base member, whereby the rotational force is transferred through the first base member to the second base member and converted into an increased axial force operable relative to the second base member.

According to another embodiment of the present invention there is provided a chuck device, further comprising: means for chucking an external item in the second base member, and the means for chucking receiving the increased axial force and securely chucking the external item to the second base member, whereby the external item is easily secured with a holding force magnified from the rotational force.

According to another embodiment of the present invention there is provided a chuck device, further comprising: at least a first conversion member in the means for converting, the second means for receiving effective to drive the first conversion member away from the first means for receiving and increasing, at least a first sloped engagement groove on the first conversion member, at least a first claw member in the means for chucking, at least a first engagement section on the first claw member, the first sloped engagement groove sloped relative to a first direction of motion of the first claw member relative to the second base member, the means for chucking effective to operate the at least first claw member axially along an axial direction of the second base member, and the first sloped engagement groove engaging the first engagement section effective to retain the first engagement section and to drive the first engagement section in the first direction of motion and fix the external item to the second base member, whereby the external item is secured to the chuck device.

According to another embodiment of the present invention there is provided a chuck device, further comprising: at least a first worm gear in the first means for receiving and increasing, at least a second worm wheel in the second means for receiving and for further increasing, the rotational force operable about a first diameter, the first worm gear having a first rotational axis and a second diameter, the second diameter greater than the first diameter, the second worm wheel having a second rotation axis, the first rotational axis perpendicular to the second rotational axis, and the first worm gear threadably engaging the second worm wheel and effective to magnifying the rotational force.

According to another embodiment of the present invention there is provided a chuck device, further comprising: a first operational axis on the means for converting, the first operation axis parallel the second rotational axis, the first operational axis perpendicular the an axial direction of motion of the first claw member, the first operational axis perpendicular to the first rotational axis, the first sloped engagement groove sloped relative to first operation axis, and the means for converting effective to receive the increased rotational force and operate along the second rotational axis, whereby the first claw member operates simultaneously in the first direction of motion relative to the second base member and the along the first sloped engagement groove relative to the first conversion member.

According to another embodiment of the present invention there is provided a chuck device, further comprising: at least a first engagement groove in the second base member, at least a first leg on first claw member, the first leg in the first engagement groove, and the first engagement groove effective to engage the first leg and operate the first claw member axially along the first direction of motion.

According to another embodiment of the present invention there is provided a chuck device, wherein: the first sloped engagement groove has a slope on or about 70 degrees relative to a direction of motion of the first claw member.

According to another embodiment of the present invention there is provided a chuck device, wherein: the first base member includes at least a first hole and a second hole, the first worm gear in the first hole, the second worm wheel in the second hole, at least a first cover, the first cover on at least a first face of the first base member, the at least first cover effective to operably retain the first worm gear in the first hole and allow external input of the rotational force, at least a second cover, the second cover on a second face of the first base member opposite, the first face perpendicular to the second face, and the at least second cover effective to operably retain the second worm wheel in the second hole and allow operation of the conversion member relative to the worm wheel.

According to another embodiment of the present invention there is provided a chuck device, further comprising: at least a first grease access in the at least first claw member, the first grease access parallel the first direction of motion, and the first grease access operable along a first face of the first sloped engagement groove, whereby an external lubricant is easily applied between the conversion member and the first engagement section effective to allow smooth operation of the chuck device.

According to another embodiment of the present invention there is provided a chuck device, further comprising: a second sloped engagement groove on the first conversion member, a second claw member in the means for chucking, at least a second engagement section on the second claw member, the second sloped engagement groove sloped relative to a second direction of motion of the second claw member relative to the second base member, the means for chucking effective to operate the second claw member axially along the axial direction of the second base member, and the second sloped engagement groove engaging the second engagement section effective to retain the second engagement section and drive the second engagement section along the second direction of motion and fix the external item to the second base member, whereby the external item is secured to the chuck device.

According to another embodiment of the present invention there is provided a chuck device, comprising: a first base member, a second base member on the first base member, first means for receiving and increasing a rotational force, the first means for receiving and increasing in the first base member, second means for receiving the rotational force from the first means and for further increasing the rotational force into an increased rotational force, the second means for receiving in the first base member, the second means for receiving effective to redirect the increased rotational force perpendicular to the first means for receiving and increasing, means for converting the increased rotational force from the second means into an increased axial force perpendicular the first and the second means, the means for converting operable between the first and the second base member, whereby the rotational force is transferred through the first base member and into the second base member and converted into an increased axial force operable relative to the second base member, means for chucking an external item in the second base member, the means for chucking receiving the increased axial force and securely chucking the external item to the second base member, whereby the external item is easily secured with a holding force magnified from the rotational force, at least a first conversion member in the means for converting, the second means for receiving effective to drive the first conversion member away from the first means for receiving and increasing, at least a first sloped engagement groove on the first conversion member, at least a first claw member in the means for chucking, at least a first engagement section on the first claw member, the first sloped engagement groove sloped relative to a first direction of motion of the first claw member relative to the second base member, the means for chucking effective to operate the at least first claw member axially along an axial direction of the second base member, and the first sloped engagement groove engaging the first engagement section effective to retain the first engagement section and to drive the first engagement section in the first direction of motion and fix the external item to the second base member, whereby the external item is secured to the chuck device.

According to another embodiment of the present invention there is provided a chuck device, comprising: first means for receiving and increasing a rotational force, second means for receiving and increasing the rotational force from the first means and outputting an increased rotational force, the second means for receiving redirecting and rotational force from a first base member to a second base member, means for receiving and converting the increased rotational force from the second means into an increased axial force, means for chucking an external item to the second base member, and the means for chucking receiving the increased axial force and securing the external item to the second base member and the chuck device.

According to another embodiment of the present invention there is provided a chuck device, further comprising: at least a first conversion member in the means for receiving and converting, at least a first sloped engagement groove on the first conversion member, at least a first claw member in the means for chucking, at least a first engagement section on the first claw member, the first sloped engagement groove sloped relative to a direction of motion of the first claw member, the means for chucking effective to operate the at least first claw member axially along an axial direction of the second base member, and the first sloped engagement groove engaging the first engagement section effective to drive the first engagement section in the direction of motion and fix the work item in the second base member, whereby the work item is secured in the chuck device.

According to another embodiment of the present invention there is provided a chuck device, further comprising: at least a first worm gear in the first means for receiving and increasing, at least a second worm wheel in the second means for receiving and increasing, the first worm gear having a first rotational axis, the second worm wheel having a second rotation axis, the first rotational axis perpendicular to the second rotational axis, and the first worm gear operably threadably engaging the second worm and magnifying the rotational force.

According to another embodiment of the present invention there is provided a chuck device, including a first base member and at least a first claw member movably mounted on the first base member, for chucking an external item by moving the first claw member, the chuck device comprising: a first input member for receiving and applying a rotational force, a first gear mechanism effective to receive and increase the rotational force, a second gear mechanism effective to receive the rotational force from the first gear mechanism, increase the rotational force, and operate a screw shaft member along an axial direction perpendicular to the first input member, and a conversion mechanism effective to receive the rotational force, resist rotation relative to the first input member, and convert the rotational force into an axial force to drive the at least first claw member in an axial direction relative the first base member, whereby the chuck device securely engages the external item.

According to another embodiment of the present invention there is provided a chuck device, further comprising: a worm gear in the first gear mechanism, a worm wheel in the second gear mechanism, the worm gear rotating integrally with the input member, the worm gear threadably engaging and the worm wheel, the second gear mechanism including a threaded hole concentric with a center of the worm wheel, and a screw shaft member threadably engaging the threaded hole.

According to another embodiment of the present invention there is provided a chuck device, wherein: the conversion mechanism includes a conversion member, the conversion member secured to the screw shaft member and at least a first sloped engagement groove on the conversion member, the first sloped engagement groove sloped relative to a direction of motion of the first claw member, at least a first engagement section on the first claw member, and the first engagement section slidably engaging the first sloped engagement groove and preventing the conversion member from rotating relative to the worm wheel.

According to another embodiment of the present invention there is provided a chuck device, further comprising: at least the first and a second claw member, the first and the second claw members disposed facing each other on the base member, a first leg on the first claw member, a second leg on the second claw member, the first and the second legs slidably engaging a shared engagement groove on the base member effective to axially align the first and the second claw members, at least a second sloped engagement groove on the conversion member, the second sloped engagement groove sloped relative to a direction of motion of the second claw member, at least a second engagement section on the second claw member, the second engagement section slidably engaging the second sloped engagement groove and preventing the conversion member from rotating relative to the worm wheel, and the conversion mechanism effective to slidably engage and move the first and the second claw member symmetrically along the shared engagement groove.

The present invention provides a chuck device for chucking a workpiece or a tool by moving single or multiple claw members. The chuck device includes a base member and at least one claw member movably mounted on the base member. The chuck device also includes an input member for applying a rotational drive force, a gear mechanism using a rotational drive force applied through the input member to drive a screw shaft member in an axial direction, and a conversion mechanism redirecting an axial drive force transferred through the screw shaft member and driving a claw member.

The above, and other objects, features and advantages of the present invention will become apparent from the fol-

DETAILED DESCRIPTION OF THE PREFERRED EMBODIMENTS

Figure 1:
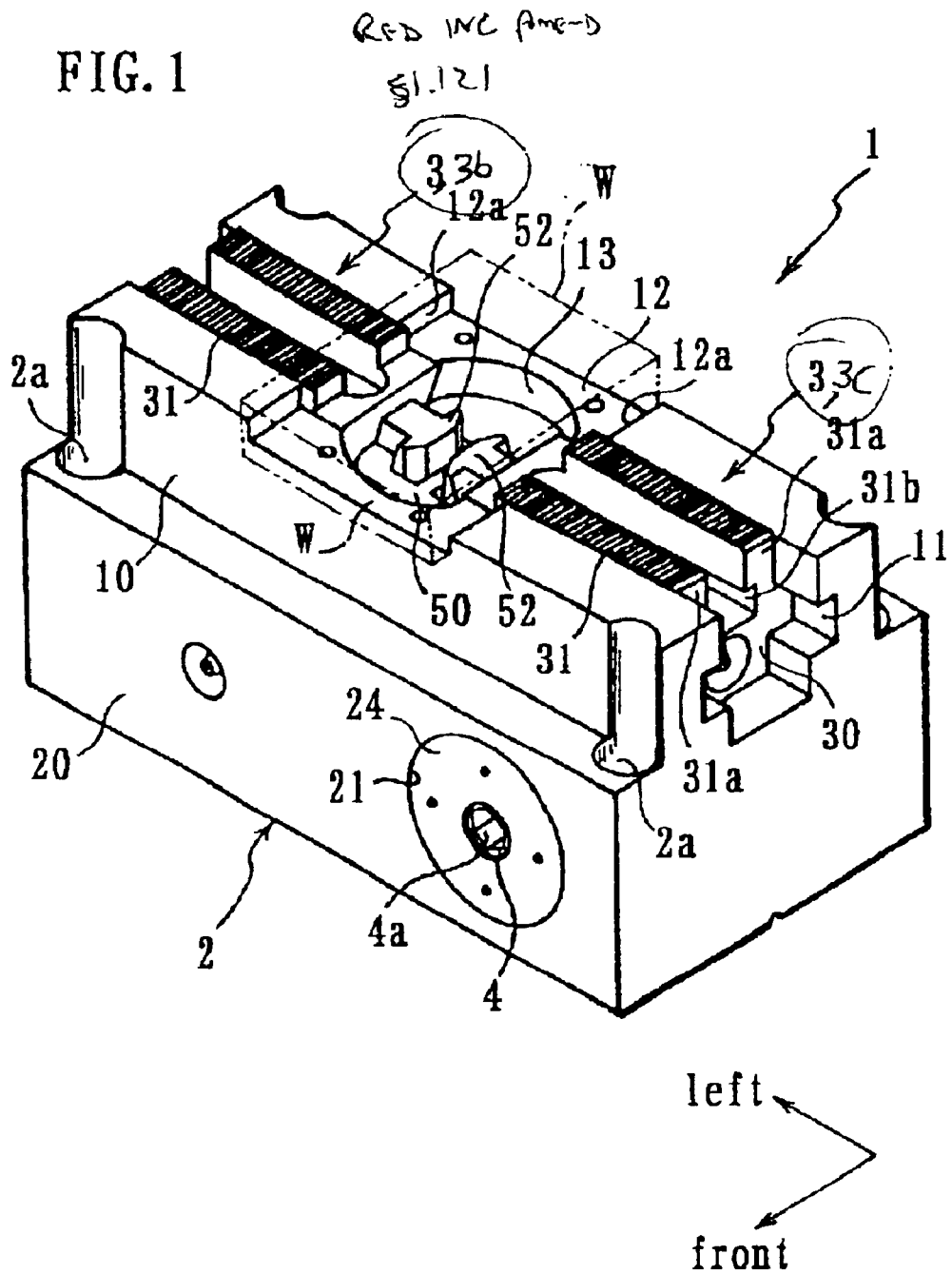
FIG. 1 is a perspective drawing of a chuck according to an embodiment of the present invention.
Figure 2:
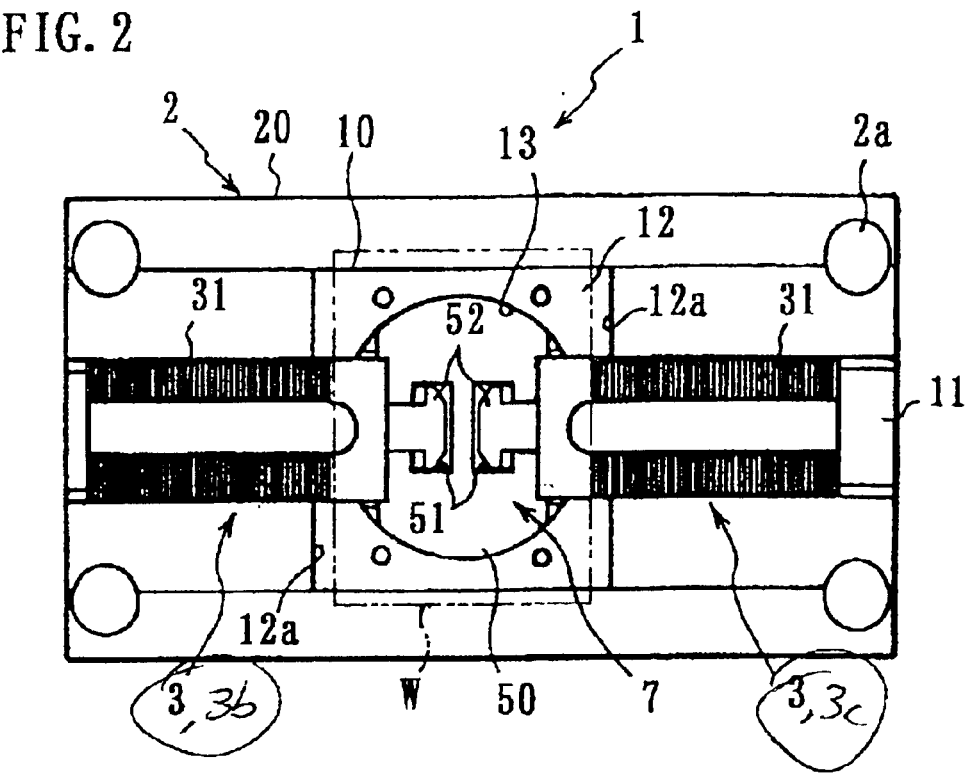
FIG. 2 is a plan drawing of the chuck device of FIG. 1.

Referring now to FIGS. 1 and 2, a two-claw-type chuck device 1 includes a base member 2 and a pair of claw members 3. Chuck device 1 also includes front and rear input shaft members 4 and a worm gear mechanism 5 (shown later) in base member 2. A second gear mechanism 6 (shown later), and a conversion mechanism 7 extend from base member 2 into an upper block 10. Claw members 3 fix a workpiece W in chuck device 1, as will be described.

During operation, input shaft member 4 receives an input rotational force, not shown. Input shaft member 4 rotates to transmit an input rotational force to worm gear mechanism 5, second gear mechanism 6, and conversion mechanism 7. The input rotational force is magnified and transferred to claw members 3. During operation, a left claw member 3b and a right claw member 3c move symmetrically to axially inward to fix workpiece W in chuck device 1, as will be explained.

The illustrated base member 2 is a wide rectangular shape when seen from above. However, base member 2 may be of any shape sufficient to embody the present invention and support workpiece W.

Base member 2 includes integrally formed upper block 10 and a lower block 20. Lower block 20 is wider than upper block 10 for stability, but may have other shapes sufficient to stabilize workpiece W.

Claw members 3 are movably mounted on an (upper surface section) of upper block 10. Four bolt holes 2a are located in the corner areas of lower block 20. Four bolts (not shown) are insertable into bolt holes 2a to secure base member 2 to the table (not shown) of a machine tool (not shown) to support lower block 20.

An engagement groove 11 along a left-right axis of upper block 10 has an approximately T-shape cross-section.

A pair of legs 30 (only one of which is shown), on respective claw members 3, are slidably engaged in shared engagement groove 11. Upper block 10 includes a lowered section 12 to form a shelf 12a at a central section along the left-right axis. A hole 13 in upper block 10 extends downward from lowered section 12 to lower block 20 to communicate with engagement groove 11.

Claw members 3 are symmetrically positioned in upper block 10. Each claw member 3 includes a leg 30 with a main claw unit 31 extending above leg 30, terminating in an engagement section 52. Engagement sections 52 are located on the end of each leg 30, near lowered section 12.

Conversion mechanism 7 includes a conversion member 50, a sloped engagement grooves 51, and engagement sections 52.

Main claw unit 31 includes a pair of front and rear claw sections 31a extending upward from the upper end of leg 30. A groove 31b is formed inside main claw unit 3 and is surrounded by claw sections 31a and the upper end of leg 30.

Front and rear claw sections 31a extend parallel to each other along the left-right axis of chuck device 1. The upper ends of front and rear claw sections 31a of the left and right claw members 3 face each other. The facing ends of left and right claw sections 31a chuck (hold) workpiece W on lowered section 12 thereby supporting workpiece W from both ends.

A horizontal hole 21 on a first side of lower block 20 extends through from the first side to the second side of lower block 20. A pair of covers 24 are fitted into a front and a rear side of horizontal hole 21 (rear side cover 24 not shown). During operation, covers 24 prevent input shaft member 4 from slipping out of lower block 20.

An angular hole 4a at an outer end of input shaft member 4 receives an end of a rotation tool, such as a hexagonal wrench. Rotation of the rotation tool, rotates input shaft member 4 to apply rotational drive force to tighten or loosen chuck device 1.

Figure 3:
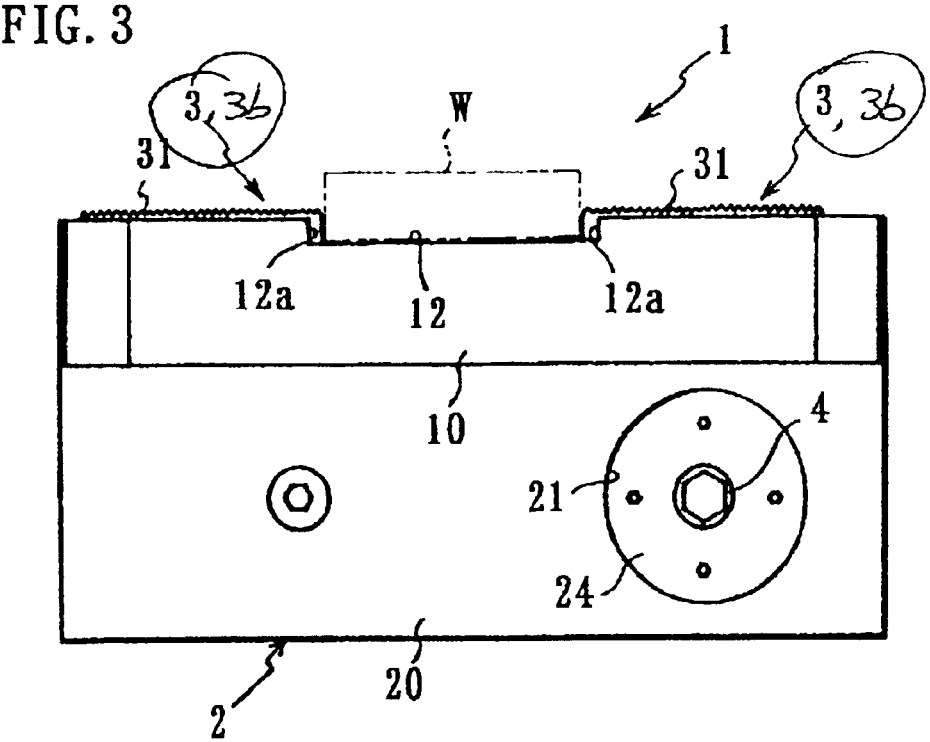
FIG. 3 is a front-view drawing of the chuck device of FIG. 1.
Figure 4:
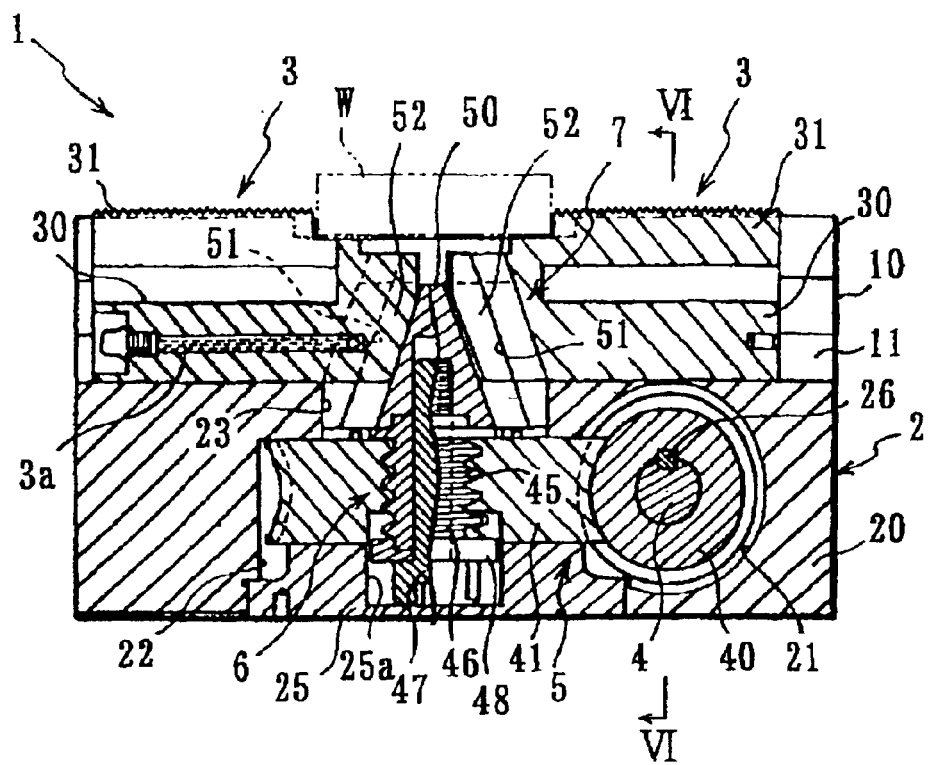
FIG. 4 is a vertical cross-section drawing of the chuck device in a chucked state.
Figure 5:
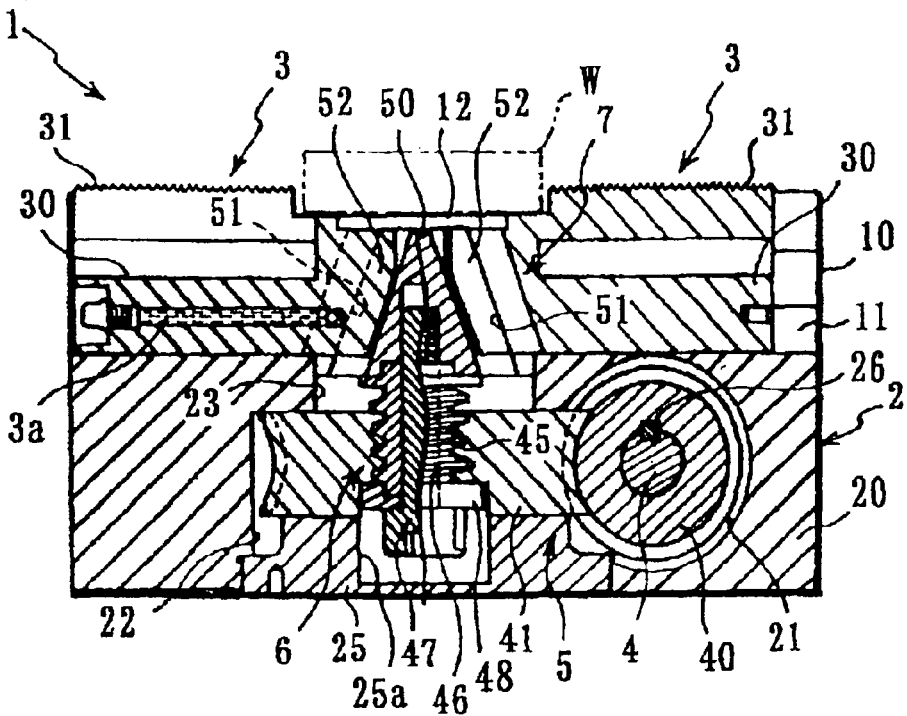
FIG. 5 is a vertical cross-section drawing of the chuck device in an unchucked state.

Referring now to FIGS. 3 to 5, a vertical hole 22 extends upward from a bottom of lower block 20 to a center portion of lower block 20. A right end of vertical hole 22 communicates with horizontal hole 21, as will be described. A vertical hole 23 extends upward from vertical hole 22 into upper block 10. Vertical hole 23 communicates with hole 13. A cover 25 is fitted into the bottom of vertical hole 22, as will be described.

During operation, input shaft members 4 receive input rotational drive force for application to chuck device 1. Front and rear input shaft members 4 in horizontal hole 21 of base member 2 is fitted into lower block 20 where they are rotatably supported by respective covers 24.

Worm gear mechanism 5 includes a worm gear 40 and a worm wheel 41 meshing with the worm gear 40. During assembly, inner ends of input shaft members 4 are inserted into worm gear 40. A key member 26, links input shaft members 4 to worm gear 40 to prevent their relative rotation.

Each leg 30 of each claw member 3 include a grease hole 3a. During operation and maintenance, lubricant fed into grease holes 3a and between sloped engagement grooves 51 and engagement sections 52 lubricates chuck device 1.

Worm gear mechanism 5, mounted inside base member 2, includes a worm gear 40, which rotates integrally with input shaft members 4.

Worm wheel 41 is disposed within vertical hole 22 of base member 2. Cover 25 and base member 2 rotatably support worm wheel 41 to prevent worm wheel 41 from moving along its axis. Worm wheel 41 is rotatably fitted and screwed to a screw shaft member 46 of second gear mechanism 6.

Second gear mechanism 6 is mounted in base member 2. Second gear mechanism 6 drives screw shaft member 46 axially using the rotational drive force transferred from worm gear mechanism 5.

Second gear mechanism 6 includes a threaded hole 45 formed concentric with a center of worm wheel 41. Screw shaft member 46 is screwed into threaded hole 45. A bolt 47 is inserted in the center of screw shaft member 46 with the threaded section of bolt 47 projecting upward beyond screw shaft member 46 to link into conversion member 50 of conversion mechanism 7 so that screw shaft member 46 and conversion member 50 are linked together in a fixed manner.

A collar member 48 is secured between screw shaft member 46 and a head of bolt 47. Collar member 48 has a diameter that is slightly smaller than that of a hole 25a of cover 25.

During operation, when screw shaft member 46 is in a lowered state, collar member 48 fits into hole 25a to place the axial center of the screw shaft member 46 and the rotational center of the worm wheel 41 in fixed positions.

Conversion mechanism 7 changes the direction of the axial drive force transferred to screw shaft member 46, thereby transferring this force symmetrically to left-right force on claw members 3. The conversion mechanism 7 includes a conversion member 50, sloped engagement grooves 51 and a pair of engagement sections 52.

Figure 6:
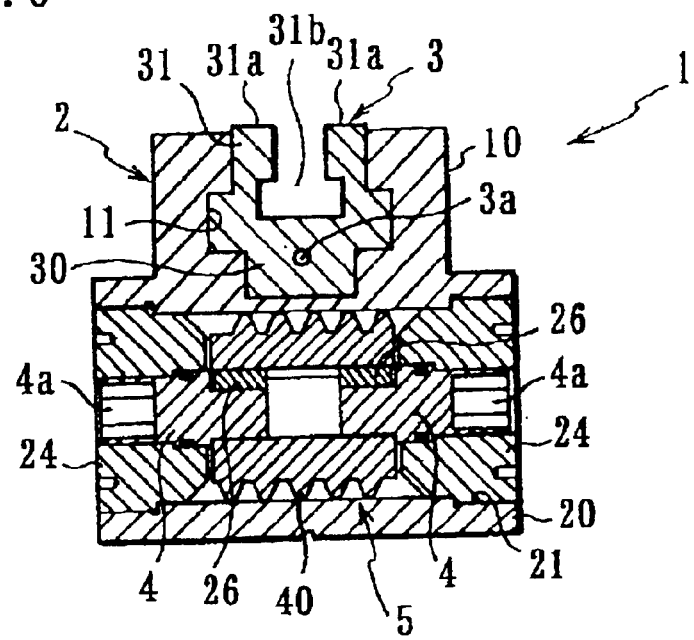
FIG. 6 is a cross-section drawing taken along the VI—VI line in FIG. 4.
Figure 7:
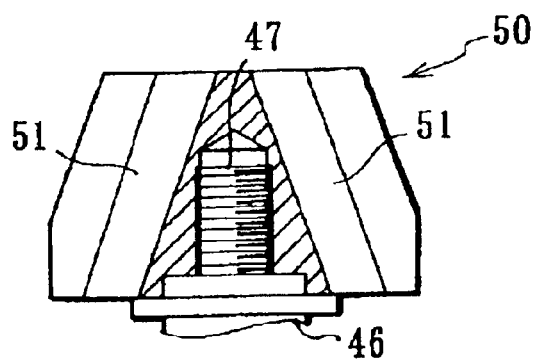
FIG. 7 is a vertical cross-section drawing of a conversion member.
Figure 8:
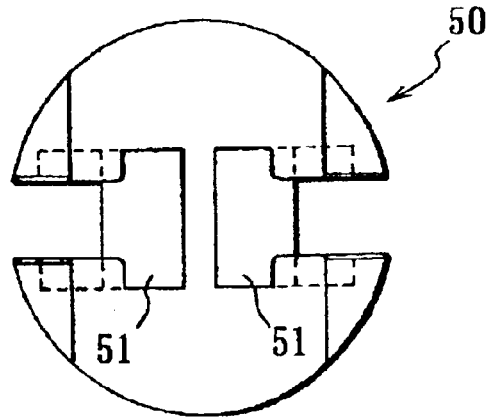
FIG. 8 is a plan drawing of a conversion member.
Figure 9:
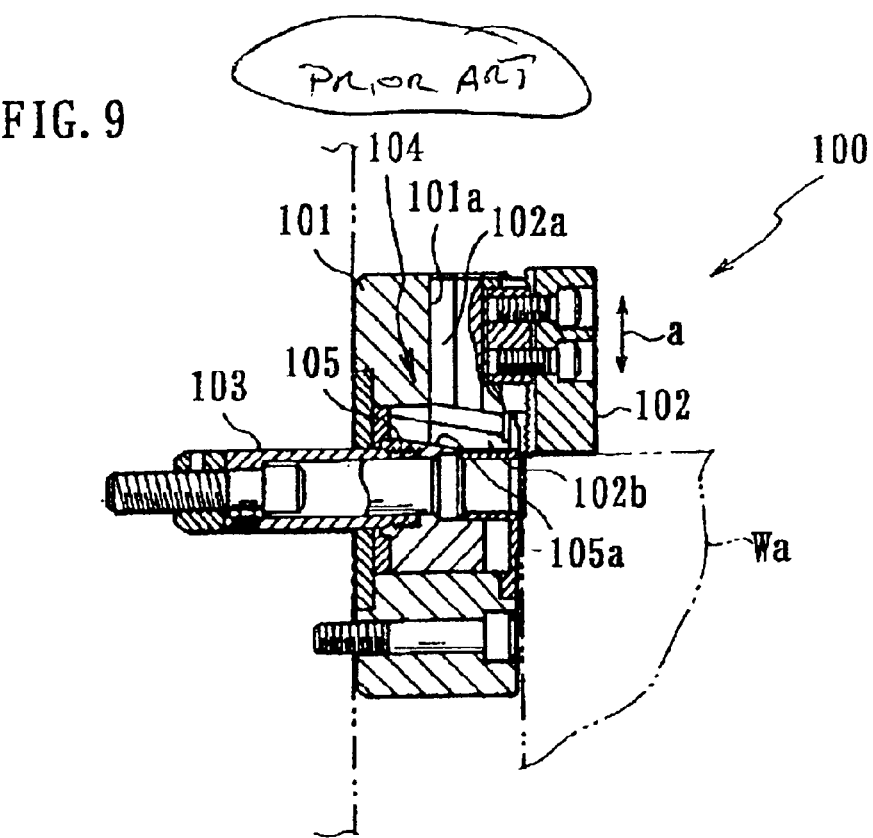
FIG. 9 is a vertical cross-section of a conventional chuck device.
Figure 10:
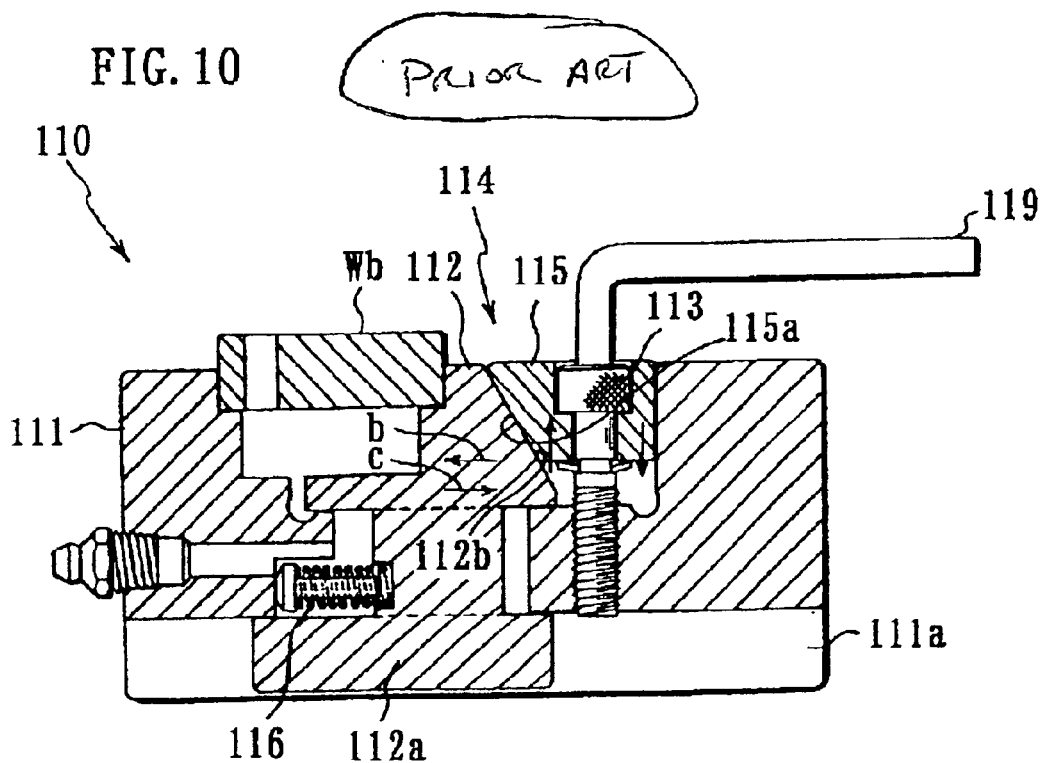
FIG. 10 is a vertical cross-section drawing of another conventional chuck device.

Referring now to FIGS. 6 to 8, worm gear mechanism 5 increases drive torque by slowing down the rotational drive force input from input shaft member 4.

Conversion member 50 is secured to screw shaft member 46 by bolt 47. Conversion member 50 is disposed within holes 13 and vertical hole 23 in base member 2. Conversion member 50 includes T-shaped sloped engagement grooves 51 each sloped in the direction of movement of its respective claw member 3.

Claw members 3 each include engagement sections 52 which slidably engage with sloped engagement grooves 51. Each engagement section 52 engages with its respective sloped engagement groove 51, thereby preventing conversion member 50 from rotating relative to base member 2. Since each engagement section 52 engages with each sloped engagement groove 51 on conversion member 50, claw members 3 operate simultaneously to capture or release workpiece W.

In one particular embodiment of the present invention, sloped engagement grooves 51 are sloped at approximately 70 degrees relative to the direction of motion of claw members 3 (the horizontal direction). During operation, as engagement grooves 51 move lower relative to a top surface of upper block 10, claw members 3 move further from the axial center of conversion member 50.

As the conversion member 50 and screw shaft member 46 move lower relative to the top surface of upper block 10, claw members 3 move closer to each other. Conversely, as conversion member 50 and screw shaft member 46 move higher, the claw members 3 move further apart.

The operations and advantages of the two-claw chuck device 1 will be described.

During operation, when chucking workpiece W into chuck device 1, conversion member 50 is first moved upward to provide adequate space between claw members 3. Workpiece W is then set onto lowered section 12. When conversion member 50 is moved to an uppermost position, claw members 3 are separated by a maximum distance. However, when setting workpiece W, claw members 3 may not need to be separated by the maximum distance and are adjustable according to operational needs.

After insertion, the end of the rotation tool (hexagonal wrench) engages angular hole 4a of input shaft member 4 to manually rotate input shaft member 4 thereby to move claw members 3 toward each other. In worm gear mechanism 5, worm gear 40 rotates integrally with input shaft member 4, and worm wheel 41, meshed with worm gear 40, rotates around the vertical axis.

In second gear mechanism 6, worm wheel 41 is restrained from vertical movement when worm wheel 41 is rotated, and screw shaft member 46, screwed into threaded hole 45 of worm wheel 41 is driven downward. Conversion member 50, secured to screw shaft member 46 is correspondingly lowered.

In conversion mechanism 7, when conversion member 50 moves downward, sloped engagement grooves 51, and engagement sections 52 cause claw members 3 to move toward workpiece W.

Upon tightening, the upper ends of claw sections 31a of claw members 3 firmly chuck workpiece W, thereby securing workpiece W for machining. Machining is then performed on workpiece W in a chucked state.

When removing workpiece W, the rotation tool rotates input shaft member 4 in an opposite direction to separate claw members 3. The rotation causes screw shaft member 46 to move upward, thus causing conversion member 50, secured to screw shaft member 46, to move upward as well, thereby driving claw members 3 apart (through conversion mechanism 7) to releases workpiece W.

According to the present invention, worm gear mechanism 5 allows the rotational drive force input through input shaft member 4 to be significantly mechanically multiplied. Furthermore, second gear mechanism 6 further increases the rotational drive force transferred from worm gear mechanism 5 before transferring the force to screw shaft member 46 and driving screw shaft member 46 in the axial direction. The axial drive force transferred by screw shaft member 46 is redirected and increased by conversion mechanism 7 and is transferred substantially equally to claw members 3. Claw members 3 move symmetrically.

The drive force input through input shaft member 4 can be increased in three stages and then transferred to claw members 3. As a result, simply applying a manual drive torque to input shaft member 4 can easily and firmly chuck workpiece W into chuck device 1. This improves the usability of chuck device 1 to make chucking operations more efficient, thus minimizing machining imprecision and damage to cutting tools.

A high ratio for increasing the drive force can be provided even without a very large ratio between the displacement stroke of claw members 3 and the displacement strokes of conversion member 50 and screw shaft member 46.

Since claw members 3 are mounted on the upper surface of base member 2, and since worm gear mechanism 5 and second gear mechanism 6 are mounted inside base member 2, the structure for increasing the drive force is compact. The entry of debris, such as cuttings, into gear mechanisms 5, 6 is minimized.

Since claw members 3 face each other, and since legs 30 slidably engage shared engagement groove 11, shared engagement groove 11 reliably guides and supports claw members 3 on a common axis. As a result, workpiece W is reliably chucked and supported from either side by claw members 3.

Multiple additional embodiments of chuck device 1 are described below each containing the essence of the invention.

In another embodiment, worm gear mechanism 5 may be omitted and a rotation member may be provided to substitute for worm wheel 41. This allows screw shaft member 46 to screw into a threaded hole formed in the rotation member. Alternative input members to receive rotational drive force may be provided to rotate the rotation member and drive screw shaft member 46 axially.

In another embodiment, a single claw member may replace claw members 3. In this embodiment, workpiece W is chucked by supporting it between the claw member and a receiving section of base member 2. Alternatively, three claw members can be provided. Workpiece W can be chucked using these three claw members. Changes in the number of claw members can be easily handled simply by changing the number and positions of the sloped engagement grooves formed on conversion member 50 in conversion mechanism 7.

In a third embodiment, input shaft member 4 may be rotated by an actuator such as a motor to apply rotational drive force to input shaft member 4. Since rotation of input shaft member 4 does not require a high drive force, the actuator can be compact, thus allowing chuck device 1 to be compact and minimize production costs.

In a fourth embodiment, an upper plate, used to chuck workpiece W by supporting it in cooperation with one of claw members 3, can be secured to lowered section 12 using bolts screwed into lowered section 12. Here, the other claw member 3 is not used. In this embodiment, mounting the upper plate adapted to work pieces having unusual shapes, makes it possible to chuck or secure work pieces smaller than work piece W. Furthermore, after the upper plate is mounted, the upper plate may adapt to a particular shape corresponding to the shape of an oddly shaped work piece. This embodiment provides reliable chucking for different or oddly shaped work pieces W.

The present invention may be used in chuck devices that secure the work piece to a rotating body of a machine tool or that secure tools to a principal operational axis.

With chuck device 1, according to the present invention, a light manual drive force, applied to drive claw members 3, is multiplied to forcefully and firmly chuck workpiece W, thus increasing operation efficiency. As described above, 'chucking' is meant to indicate securely retaining a work piece or tool in chuck device 1. During operation of chuck device 1, either a work piece or a tool should be understood as a work item. The phrase 'work item' represents an item which must be held securely and steadily in chuck device 1 and may be either a work piece or a tool used on a work piece.

Chuck device 1 may include from one-claw to multi-claw embodiments adapted from the principal of the present invention. For example, in a one-claw embodiment, one of the claws is replaced with a fixed member. In a three-claw embodiment, the claws operate radially from a common center to fix a workpiece.

It should be understood, that chuck device 1 operates as a way to chuck or retain items, such as work piece W or a tool, during a processing operation.

During operation, when rotational drive force is applied through the input member, the rotational drive force drives the screw shaft member in the axial direction via a gear mechanism. The axial drive force transferred to the screw shaft member is redirected by a conversion mechanism for transfer to the claw member, thereby moving the claw member. The gear mechanism allows the rotational drive force applied through the input member to be significantly increased as it is transferred to the screw shaft member.

Since the drive force applied to the input member is multiplied significantly as it is transferred to the claw member, a work piece or tool can be firmly chucked by the claw member by applying a relatively small drive force to the input member. This ability to multiply input force improves the efficiency of chucking operations.

During operation, if an actuator is used to drive the input member, a relatively small actuator can be used, thus allowing the chuck device to be compact and reducing production costs.

A high drive rate increase ratio can be provided without excessively increasing the ratio of the displacement stroke of the screw shaft member or the like to the displacement stroke of the claw member.

In the chuck device described, the gear mechanism may include a worm gear mechanism for slowing down the rotational drive force applied through the input member and a second gear mechanism that uses the rotational drive force transferred from the worm gear mechanism to drive the screw shaft member in an axial direction. The worm gear mechanism significantly increases the rotational drive force applied to the input member and provided a great benefit. The rotational drive force increased by the worm gear mechanism is further increased by the second gear mechanism, which transfers the drive force to the screw shaft member, driving it in the axial direction. Operating together, an initial rotational force is greatly increased to permit the chuck mechanism to be easily, simply, and accurately adjusted.

During operation, when screw shaft member 46 is driven in the axial direction, conversion mechanism 7 drives conversion member 50 integrally with screw shaft member 46, changing the engagement position of engagement sections 52 in sloped engagement grooves 51. As a result, the drive force in the axial direction from screw shaft member 46 is further multiplied when transferred to claw member 3.

Although chuck device 1 is shown with a pair of claw members 3, a single claw member can be used on chuck device 1 to retain work piece W between the single claw member and a fixed member or an external fixed or movable member.

The input member of the chuck device can be driven manually but is easily adapted for driving by a small electrical or hydraulic actuator.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims. In the claims, means-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of the wooden part together, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A chuck device for chucking an external item, comprising:
a base member;
at least a first claw member moveable on said base member in a first direction between a first position wherein said claw member engages said external item and a second position wherein said claw member does not engage said external item,
a rotatable input member provided in said base member and configured to apply a rotational drive force,
a screw shaft member provided in said base member and moveable in a second direction substantially perpendicular to said first direction to apply an axial drive force,
a gear mechanism provided in said base member and coupled to said input member and said screw shaft member, wherein the gear mechanism is further configured to receive the rotational drive force from said input member and propel the screw shaft member in said second direction,
a conversion mechanism coupled to said screw shaft member and said claw member, wherein the conversion mechanism is further configured to receive said axial drive force and propel said first claw member in said first direction;
wherein said gear mechanism further comprises:
a worm gear mechanism having a worm gear coupled to said input member and a worm wheel coupled to said worm gear, and
a second gear mechanism coupled to said worm wheel and said screw shaft member, the second gear mechanism further configured to move said screw shaft member in said second direction guided by a threaded hole formed in said worm wheel in response to rotation of the worm wheel.

2. The chuck device according to claim 1, wherein said chuck device further comprises a second claw member moveable on said base member and wherein said first and second claw members are symmetrically moveable on the base member in said first direction.

3. A chuck device for chucking an external item, comprising:
a base member,
at least a first claw member moveable on said base member in a first direction between a first position wherein said claw member engages said external item and a second position wherein said claw member does not engage said external item,
an rotatable input member provided in said base member and configured to apply a rotational drive force,
a worm gear mechanism coupled to said input member and configured to decelerate said rotational drive force,
a screw shaft member provided in said base member and moveable in a second direction substantially perpendicular to said first direction to apply an axial drive force,
a second gear mechanism provided in said base member and coupled to said worm gear mechanism and said screw shaft member, wherein the second gear mechanism is further configured to receive the decelerated rotational drive force from said worm gear mechanism and propel the screw shaft member in said second direction, and
a conversion mechanism coupled to said screw shaft member and said first claw member, wherein the conversion mechanism is further configured to receive said axial drive force and propel said first claw member in said first direction.

4. The chuck device according to claim 3, wherein:
said worm gear mechanism further comprises a worm gear coupled to said input member and a worm wheel coupled to said worm gear, and wherein
said second gear mechanism is coupled to said worm wheel and said second gear mechanism is further configured to move said screw shaft member in said second direction guided by a threaded hole formed in said worm wheel in response to rotation of the worm wheel.

5. The chuck device according to claim 3, wherein:
said claw member further includes an integral engagement section, and
said conversion mechanism further comprises a conversion member coupled to said screw shaft member, the conversion member having an angularly sloped engagement groove sloped relative to the first direction and slideably engaging with said integral engagement section.

6. The chuck device according to claim 5, wherein the sloped engagement groove has a substantially T-shaped cross section.

7. The chuck device according to claim 3, wherein:
said base member further comprises a shared engagement groove, and
wherein said chuck device further comprises a second claw member moveable on said base member and wherein said first and second claw members are symmetrically moveable on the base member in said first direction, each of said first and second claw members further comprising a leg portion slideably engageable with said shared engagement groove.

8. The chuck device according to claim 7, wherein said leg portion further includes a grease hole.

9. The chuck device according to claim 7, wherein the shared engagement groove has a substantially T-shaped cross-section.

10. The chuck device according to claim 3, wherein the input member is further configured to receive a manual rotation force.

11. A chuck device, comprising:
a first base member;
a second base member on said first base member;
first means in said first base member for receiving and increasing a rotational force;
second means in said first base member for receiving said rotational force from said first means and for increasing said rotational force into an increased rotational force;
said second means for receiving including means for redirecting said increased rotational force perpendicular to said first means for receiving and increasing;
means for converting said increased rotational force from said second means into an increased axial force perpendicular to said first and said second means;
said means for converting being operable between said first and said second base member, whereby said rotational force is transferred through said first base member to said second base member and converted into an increased axial force operable relative to said second base member;

means for chucking an external item in said second base member, said means for chucking receiving said increased axial force and securely chucking said external item to said second base member, whereby said external item is easily secured with a holding force magnified from said rotational force;

at least a first conversion member in said means for converting;

said second means for receiving including means for driving said first conversion member away from said first means for receiving and increasing;

at least a first sloped engagement groove on said first conversion member;

at least a first claw member in said means for chucking;

at least a first engagement section on said first claw member;

said first sloped engagement groove being sloped relative to a first direction of motion of said first claw member relative to said second base member;

said means for chucking including means for operating said at least first claw member axially along an axial direction of said second base member;

said first sloped engagement groove engaging said first engagement section being effective to retain said first engagement section and to drive said first engagement section in said first direction of motion and fix said external item to said second base member, whereby said external item is secured to said chuck device;

at least a first worm gear in said first means for receiving and increasing;

at least a worm wheel in said second means for receiving and for further increasing said rotational force operable about a first diameter;

said first worm gear having a first rotational axis and a second diameter;

said second diameter greater than said first diameter;

said worm wheel having a second rotation axis;

said first rotational axis being perpendicular to said second rotational axis; and said first worm gear threadably engaging said worm wheel and being effective to magnifying said rotational force.

12. A chuck device, according to claim 11, further comprising:

a first operational axis on said means for converting;

said first operation axis being parallel said second rotational axis;

said first operational axis being perpendicular to said an axial direction of motion of said first claw member;

said first operational axis being perpendicular to said first rotational axis;

said first sloped engagement groove being sloped relative to said first operation axis; and said means for converting including means for receiving said increased rotational force and operating along said second rotational axis, whereby said first claw member operates simultaneously in said first direction of motion relative to said second base member and along said first sloped engagement groove relative to said first conversion member.

13. A chuck device, according to claim 12, further comprising:

at least a first engagement groove in said second base member;

at least a first leg on first claw member;

said first leg in said first engagement groove; and said first engagement groove including means for engaging said first leg and operate said first claw member axially along said first direction of motion.

14. The chuck device according to claim 3, wherein said base member further comprises a lower base member and an upper based member coupled to said lower base member.

15. A chuck device, according to claim 13, wherein:

said first base member includes at least a first hole and a second hole;

said first worm gear is disposed in said first hole;

said worm wheel is disposed in said second hole;

at least a first cover;

said first cover being fitted on at least a first face of said first base member;

said at least first cover including means for operably retaining said first worm gear in said first hole and allowing external input of said rotational force;

at least a second cover;

said second cover being fitted on a second face of said first base member opposite said first face perpendicular to said second face; and said at least second cover including means for operably retaining said worm wheel in said second hole and allowing operation of said conversion member relative to said worm wheel.

16. A chuck device, according to claim 15, further comprising:

at least a first grease access in said at least first claw member;

said first grease access being parallel said first direction of motion; and said first grease access being operable along a first face of said first sloped engagement groove, whereby an external lubricant is easily applied between said conversion member and said first engagement section effective to allow smooth operation of said chuck device.

17. A chuck device, according to claim 16, further comprising:

a second sloped engagement groove on said first conversion member;

a second claw member in said means for chucking;

at least a second engagement section on said second claw member;

said second sloped engagement groove being sloped relative to a second direction of motion of said second claw member relative to said second base member;

said means for chucking including means for operating said second claw member axially along said axial direction of said second base member; and said second sloped engagement groove engaging said second engagement section to retain said second engagement section and drive said second engagement section along said second direction of motion and fix said external item to said second base member, whereby said external item is secured to said chuck device.

* * * * *